UNITED STATES PATENT OFFICE.

ALBERT HAAGEN, OF COLOGNE, GERMANY.

FERRO-CHROME COLOR AND PROCESS OF MAKING SAME.

SPECIFICATION forming part of Letters Patent No. 693,703, dated February 18, 1902.

Application filed May 11, 1901. Serial No. 59,826. (No specimens.)

*To all whom it may concern:*

Be it known that I, ALBERT HAAGEN, doctor of philosophy, residing at Cologne-on-the-Rhine, Germany, have invented a certain new and useful Improvement in the Manufacture of Coloring-Matters, (for which I have applied for a patent in Germany on the 13th day of March, 1901,) of which the following is a full, clear, and exact specification.

Compounds of chromic acid with ferric oxid have been the subject of many experiments, which, however, have failed to lead to any practical result, for "ferro-chromic" colors, as this class of coloring-matter may be called, are not to be found in the market. The reason why these colors or dyes have hitherto been ignored by the trade must, without doubt, be assigned to the circumstance that according to the existing or known methods of their preparation part only of the salt of chromium used became precipitated, while the bulk of it remained in solution, whereby the cost of production was added to so considerably as to render those methods for practical purposes unworkable. V. Kletzinsky in 1872 reports on basic chromate of iron as capable of yielding under the name of "siderine-yellow" a magnificent air and light proof color free from lead (v. Dingler's *Polytechnisches Journal*, Vol. 207, page 83,) and the following passage of his report may here be quoted: "In the preparation of siderine-yellow the necessary reagents are employed in the following proportions: four hundred and thirty-three parts of crystallized perchlorid of iron to become wholly decomposed requires fourteen hundred and seventy-three parts, by weight, of bichromate of potassium. There will separate three hundred and seventy-eight parts, by weight, of basic chromate of iron or siderine-yellow, while one thousand and forty-nine parts, by weight, of what is termed 'chromic' potassium chlorid is produced at the same time, remaining in solution in water, together with three hundred and eighty-nine parts, by weight, of monochromate of potassium." Hence it will be seen that this process does not enable the expensive chromate to be fully turned to account, as only thirty per cent. of the chromic acid is used to any advantage, while seventy per cent. remains in solution. Kletzinsky denotes siderine-yellow by the following formula: $Fe_2O_3,3CrO_3H_2O$. According to Dr. Rud. Kayser's investigations (as embodied in the *Transactions of the Bavarian Trades Museum*, Nürnberg, 1875, page 42) the light-orange-colored deposit obtained by precipitating a solution of neutral chromate of potassium with an acidulated solution of perchlorid of iron consists of: $Fe_2(CrO_4)_3$ or $Fe_2O_3,3CrO_3$, while Kletzinsky expressly states that the yellow-tinged precipitate obtained in the manner just described upon being thoroughly washed is found to contain no constituents other than chromic acid, ferric oxid, and water, and in particular neither chlorin nor potassium. Elliott and Storer, who also have given their attention to the subject of production of chromate of iron and who obtained the yellow compound from iron alum and chromate of potassium (v. Gmelin-Kraut's work, *Handbuch der Chemie*, sixth edition, 1872, Vol. III, page 414,) represent this coloring-matter by the formula $Fe_2O_3CrO_3$.

The coloring-matter produced by my methods are basic double salts similar to basic iron alums in composition, the whole or part of the sulfuric acid being replaced by chromic acid. The chromic acid is precipitated almost in its entirety, and, provided the process is rightly carried out, scarcely one per cent. of chromium salt will remain behind in solution. According to the mode of precipitation adopted the results as disclosed by analysis have been as follows: In precipitating the chromium salt with sulfate of iron the percentages found were as follows: $K_2O$, 19.05 per cent.; $SO_3$, 3.09 per cent.; $CrO_3$, 40.58 per cent.; $Fe_2O_3$, twenty-five per cent.; $H_2O$, 12.27 per cent.; total, 99.99 per cent., which might be expressed by the formula:

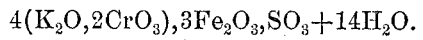

$$4(K_2O,2CrO_3),3Fe_2O_3,SO_3+14H_2O.$$

The course of the precipitating process, which would begin upon the addition of potassium carbonate to the potassium bichromate, was probably in accordance with the following equation, (the proportions given being those adopted in practice:) $3(Fe_2O_3,3SO_3)$, or twelve hundred parts, by weight, $+4(K_2O, 2CrO_3)$, or 1,180.24 parts, by weight, $+8K_2O CO_2$, or 1,106.4 parts, by weight, $+xH_2O$, being the water used for the solution, results in $4(K_2O,2CrO_3),3Fe_2O_3,SO_3,14H_2O$, or 1,992.24 parts, by weight, of color, $+8K_2OSO_3$, or 1,394.4 parts, $+8CO_2$, or three hundred and fifty-two parts by weight. Apparently there has here formed basic sulfate of iron, (one-ninth part acid,) which forms with the bichromate of potassium a double salt.

Instead of the potassium carbonate hydrated potassium oxid (potassium oxyhydrate) or other oxids or salts of the alkalies, alkaline earths, (including magnesia,) ammonia, or alumina may be employed, when, according to the manner in which they are used, the several shades or tones of color will be obtained. Where oxids or salts of the alkaline earths are added, it will be more expedient to precipitate with perchlorid of iron, so as to prevent sulfate of lime or baryta from being precipitated into the color. When other iron compounds are operated upon, it often happens that the precipitating process is not quite so thoroughly completed; but it may be assisted by precipitating alumina into the ready-made color. However, where the conditions are as above stated precipitation will be almost complete, a mere trace of chromic acid remaining in solution.

The addition of the alkali may be made either before, during, or after precipitation. The desired result is obtained, for example, when the solution of acid potassium chromate is mixed without heating with the iron solution, whereby no precipitate forms, and then precipitating the iron chromate with the alkali or other equivalent. When, for instance, acid potassium chromate is brought in solution with protosulfate of iron and precipitated with potash solution until all the iron is separated out, a voluminous reddish-brown precipitate results, which upon long standing (six to eight hours) is converted into a light yellow precipitate of chromate of iron and potash.

In view of the variety of the products obtainable it has not been possible as yet to analyze them all or to find an accurate equation for each. The result of the analysis of one more product, however, may here be given, such product having been obtained by causing perchlorid of iron to act upon bichromate of potassium mixed with calcium carbonate. In precipitating the chromium salt with perchlorid of iron the proportions found were as follows: $K_2O$, 13.89 per cent.; $CrO_3$, 39.60 per cent.; $Fe_2O_3$, 39.41 per cent.; $H_2O$, 7.09 per cent.; total, 99.99 per cent., which would correspond to this formula:

$$3(K_2O,2CrO_3),5Fe_2O_3,2CrO_3+8H_2O.$$

What is here described is therefore a novel process and products which have not hitherto been known and which according to the particular method adopted in precipitating contain sulfuric acid, potassium oxid, or other elements in addition to iron and chrome. As compared with all the other processes hitherto published this improved process offers the advantage of enabling the salts of chromium employed to be almost wholly utilized in the formation of color.

By mixing the yellow chrome iron color obtained as described above with or employing them at the same time as blue colors a vast variety of shades of green may be prepared.

What I claim is—

1. The herein-described process of producing ferro-chromic coloring-matters, which consists in bringing into reaction an acid chromium compound, a compound of iron and an alkali, substantially as set forth.

2. The herein-described process of producing ferro-chromic coloring-matters, which consists in forming an alkaline solution of a chromium salt, and subjecting said solution to the action of a soluble compound of iron, substantially as set forth.

3. As a new coloring-matter, a double salt of iron and chromium, derived from an acid chromium compound, a compound of iron and an alkali, said coloring-matter containing a high percentage of a chromium compound and potassium and being of a brilliant chrome-yellow color, substantially as set forth.

In testimony that I claim the foregoing as my invention I have signed my name in presence of two subscribing witnesses.

ALBERT HAAGEN.

Witnesses:
 CHARLES LE SIMPLE,
 KARL SCHMITT.